HIGH SPEED CATHODE RAY TUBE ENCODER

Filed May 3, 1963 6 Sheets-Sheet 1

Oct. 25, 1966 G. P. A. BATTAIL 3,281,696

HIGH SPEED CATHODE RAY TUBE ENCODER

Filed May 3, 1963 6 Sheets-Sheet 3

Oct. 25, 1966 G. P. A. BATTAIL 3,281,696

HIGH SPEED CATHODE RAY TUBE ENCODER

Filed May 3, 1963 6 Sheets-Sheet 5

United States Patent Office 3,281,696 Patented Oct. 25, 1966

3,281,696
HIGH SPEED CATHODE RAY TUBE ENCODER
Gérard Pierre Adolphe Battail, 30 Blvd. du Temple, Paris, France
Filed May 3, 1963, Ser. No. 277,769
Claims priority, application France, June 25, 1962, 901,847
8 Claims. (Cl. 325—43)

The present invention relates to a new device for sampling and encoding intelligence signals occupying very wide frequency bands, in particular the type of signal produced by television installations or by multiplex carrier-current telephone systems with a large number of frequency-staggered channels.

By way of example, it will be reminded that the frequency band occupied by a signal resulting from the juxtaposition of 300 telephone channels, covers the interval 60 to 1300 kc./s. and, by the same token, the frequency band occupied by a signal resulting from the juxtaposition of 960 telephone channels has an upper limit of 4028 kc./s.

As will be known to those skilled in the art, the translation of a continuously varying signal into a series of groups of binary coded electric pulse is effected in two stages, namely, a sampling stage in which the instantaneous amplitude value of the intelligence signal to be transmitted is measured at periodically recurring instants, and an encoding stage in which each of the so obtained samples is translated into a group of $n$ binary coded pulses, each element of which may have, according to the magnitude of the sample, one or the other of two possible signalling conditions, for instance its presence or absence, each of $2^n$ different magnitudes corresponding to one different of the $2^n$ possible permutation combinations of $n$ binary pulses.

It is also known that the sampling frequency should be at least equal to twice the upper limiting frequency of the spectrum embraced by the modulating signal. For example, for the case of 300 telephone channels, the sampling frequency should be higher than 2600 kc./s and, for 960 telephone channels, higher than 8056 kc./s.

As a consequence, the operations of sampling and encoding should be effected, in the case of wide band signals, within extremely short times, these being in the order of one tenth of a microsecond. Therefore, most known devices for the performing of these operations take advantage of the low inertia of the electron-beam in a cathode-ray tube, which makes it possible to give such beam a scanning motion at a speed high enough to be compatible with very short sampling and encoding times. Some of these known devices use special cathode-ray tubes, including apertured electrodes or "coding masks," and target electrodes located inside their evacuated envelope. Apparatus of this class is described, for instance, in papers by R. W. Sears, entitled "Electron Beam Deflection Tube for Pulse Code Modulation," and by R. L. Carbrey, entitled "Video Transmission Over Telephone Cable Pairs by Pulse Code Modulation," published in "The Bell System Technical Journal," vol. XXVII, 1948, pages 44 to 57, and in the "Proceedings of the Institute of Radio Engineers," vol. 48, 1960, pages 1546 to 1561, respectively.

Other known devices employ conventional cathode-ray tubes provided with a fluorescent screen on which the impact of the electron beam causes a luminous spot to appear. The light of this spot is focussed through a suitable optical system onto one or several coding masks consisting of plates with alternate transparent and opaque parts, behind which photoelectric tubes are so arranged as to deliver electric pulses whenever the light beam from the spot falls on one of the transparent parts of said masks. Such devices are described, for instance, in a paper by L. E. Gallaher, published in "The Bell System Technical Journal," vol. XXXVIII, 1959, pages 425 to 444, and also in the U.S. Patent No. 2,791,764 to H. J. Gray.

The device of the invention belongs to the latter class, in that it uses a conventional cathode-ray tube, an optical system, and a plurality of coding masks and photoelectric tubes. However, it fundamentally differs from those of the prior art in that it employs a very different method of sampling.

It must be remarked that in all encoding devices of the prior art using cathode-ray tubes and coding masks, while the encoding operation proper is effected by scanning of the masks by an electron or light beam deflected in a given direction, the beam should, during this operation, retain a constant deviation in another direction, substantially perpendicular to the former. The magnitude of the latter deviation corresponds to that of the sample to be coded, i.e. sampling must have been previously effected by conventional circuits, such as gated amplifiers controlled by periodic pulses recurring at the sampling frequency, or the like. As a matter of fact, the main limiting factor for the speed of operation of the known devices resides in the sampling system, not in the encoding device proper. If, for instance, a sampling frequency of ten megacycles per second is considered, the control pulses for the sampling system should have a duration of about one-tenth of the sampling period, i.e. of about ten millimicroseconds. Pulses of so short a duration together with a good wave shape are difficult to produce, as well as sampling circuits with small enough time constants to be satisfactorily operated from such pulses.

The invention aims at eliminating this drawback by effecting sampling inside the optical system preceding the encoding system proper. For this purpose, the invention makes use, to effect sampling, of a narrow transparent slit inserted between two parts of the optical system, sampling resulting from the cooperation of the scanning motion of the light beam issued from the luminous spot on the screen of the cathode-ray tube and of this narrow slit. The device of the invention also uses cylindrical lenses to focus said light beam onto said slit and to restitute from the light passing through said slit a virtual image of said spot located substantially in the plane of said screen.

According to the invention, there is provided a sampling and encoding device for a wise band intelligence signal, comprising a cathode-ray tube having a fluorescent screen, first means for deflecting the electron-beam of said tube in a first given direction porportionally to the amplitude of said signal, second means for deflecting said electron-beam in a second given direction perpendicular to said first direction under the action of a periodic scanning voltage, means for controlling the intensity of said electron-beam by said scanning voltage, a plurality of coding masks each having alternate transparent and opaque parts arranged in rectilinear strips parallel to said second direction, an optical system for projecting the light beam issuing from the luminous spot produced by the impact of said electron-beam upon said screen onto said masks, photoelectric tubes so located with respect to each of said masks as to receive projected light passing through the transparent parts of each one of said masks, and an electric utilization circuit receiving electric pulses generated by said light in said photoelectric tubes; said optical system comprising first optical means including at least one cylindrical lens for focusing said light beam upon a narrow transparent slit parallel to said first direction, second optical means including at least one further cylindrical lens and receiving light passing through said slit and producing a virtual image of said spot substantially located in the surface of said screen, a plurality of objectives receiving light from said virtual image and respectively projecting it on each one of said coding masks, and a plurality of optical condensers respectively focussing light passing through each one of said masks onto a corresponding one of said photoelectric tubes.

According to a preferred embodiment of the invention, there is provided in said utilization circuit, a threshold device eliminating all of said electric pulses having an amplitude lesser than a predetermined value.

According to a variant of said preferred embodiment of the invention, said threshold device includes gating means operated synchronously with said scanning voltage.

The usefulness of a threshold device results from the fact that, even with the fastest "phosphor" (fluorescent material) available, for the screen of a cathode-ray tube, there is a tendency of the luminous spot to persist for some time after the passage of the electron beam, which entails that the residual light it emits cannot be considered negligible after a sampling time interval. Consequently, each photoelectric tube is likely, in the absence of any other excitation, to receive residual light from spot positions immediately preceding the actual position. In other words, this residual light creates a photocathodic current which is superimposed upon the dark current in the photoelectric tube. How the devices of the invention eliminate coding errors from this origin will be explained later on.

The invention will be better understood from the following detailed description, made with reference to the attached drawing, in which:

FIGURE 1 is a view showing the general arrangement of the optical and electrical means in the device of the invention;

FIGURES 2 and 3 give a view, partly in perspective and partly in cross-section, of parts of the optical system in the device of the invention;

For convenience, in the hereinafter given description, the assembly of the already mentioned optical means including cylindrical lenses and a narrow slit will be referred to as a "cylindrical collimator." The first and second directions of motion of the electron-beam of the cathode-ray tube will be respectively referred to as "vertical" and "horizontal." The chosen code will be assumed to be an eight-digit reflx code, the main advantage of which is that two binary numbers differing by one unit are represented by coded groups differing only in one of their digits, which minimizes the risk of false coding. The digits "one" and "zero" will be assumed to correspond to a transparent and an opaque part of a coding mask, respectively. Finally, the abovementioned threshold devices, the purpose of which is to take account of the persistence of the luminous spots of the cathode-ray tube and also to "make a decision" when the projection of said spot on one or several of the coding masks falls across the separation line between an opaque and a transparent strip, will be referred to as "binary discriminators."

Figure 1:
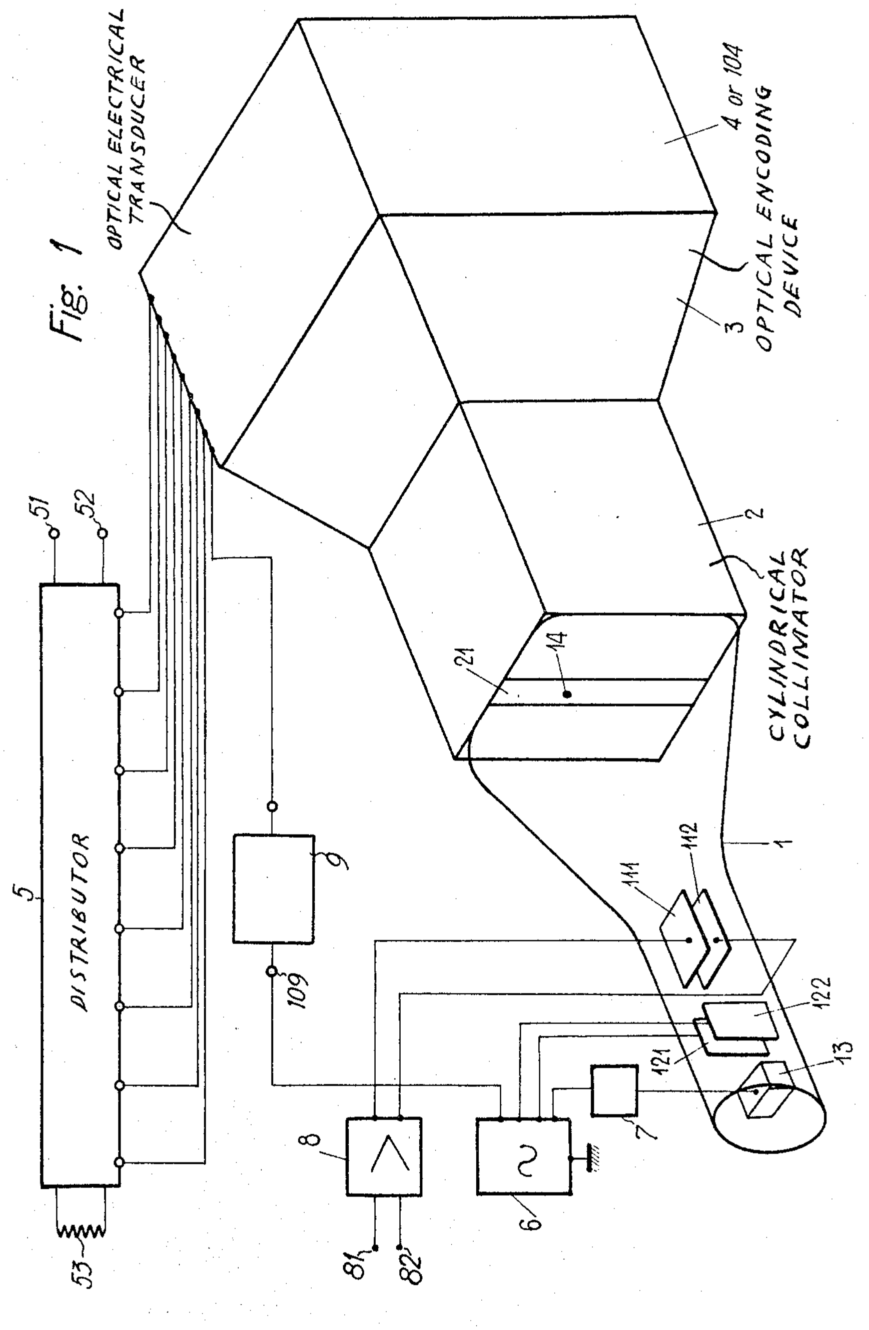

Referring now to FIGURE 1, 1 indicates a standard cathode-ray tube which translates the electrical signals to be coded into optical signals, and 2 is a "cylindrical collimator" which permits sampling to be carried out by masking the image of the spot 14 except when this image is formed in the vertical plane of symmetry of said collimator, which in this case forms a virtual point image of the spot.

3 is the optical encoding device which, as already mentioned, comprises a specific number of objective lenses, eight in the example under consideration, which form on the associated coding masks a real image of a virtual spot image produced by the cylindrical collimator 2, the formation of which will be explained latter on.

Finally, 4 designates the optical-electrical transducer for the coded signals; it comprises eight photomultiplier tubes and eight associated "binary discriminators," the simultaneous responses from which constitute the desired coded electrical signals.

The outputs of the photo-multiplier tubes are connected to a distributor 5 which transforms the simultaneously appearing binary coded pulses from 4 into a sequence of binary pulses appearing in time succession.

The intelligence signals for encoding are applied as an electric voltage to the input terminals 81, 82 of an amplifier 8 whose output terminals are connected respectively to the vertical deflection plates 111–112 for the electron-beam of the cathode-ray tube 1. An alternating current voltage, whose frequency is equal to the sampling frequency, is delivered by the time base source 6. The voltage from 6 is applied as a scanning voltage to the horizontal deflection plates 121–122 of the cathode-type ray tube 1 and also feeds the beam intensity control electrode 13 of this tube through a phase-shift network 7 such that the resulting voltage is conveniently out of phase with the voltage applied to the plates 121–122. The purpose of this latter arrangement is to control the intensity of the electron beam in such a manner that the spot produced on the fluorescent screen of the cathode-ray tube 1, in the neighbourhood of the vertical symmetry axis of the screen, be visible only when it moves in one of its two possible horizontal displacement directions, and that said electron-beam be suppressed when the spot would move in the opposite direction.

The scanning speed of the spot, on intersection with the vertical symmetry axis of the screen of the tube, is adjusted as a function of the spot diameter in such a manner that the maximum sampling time be equal to a given value; such value being a function of the desired accuracy and of the statistical properties of the signal which is to be encoded.

Self-evidently, a safety device, not shown in FIGURE 1, enables the electron-beam to be suppressed in the event that the horizontal scanning ceases; in this way burning of the fluorescent material on the screen is prevented.

Figure 2:
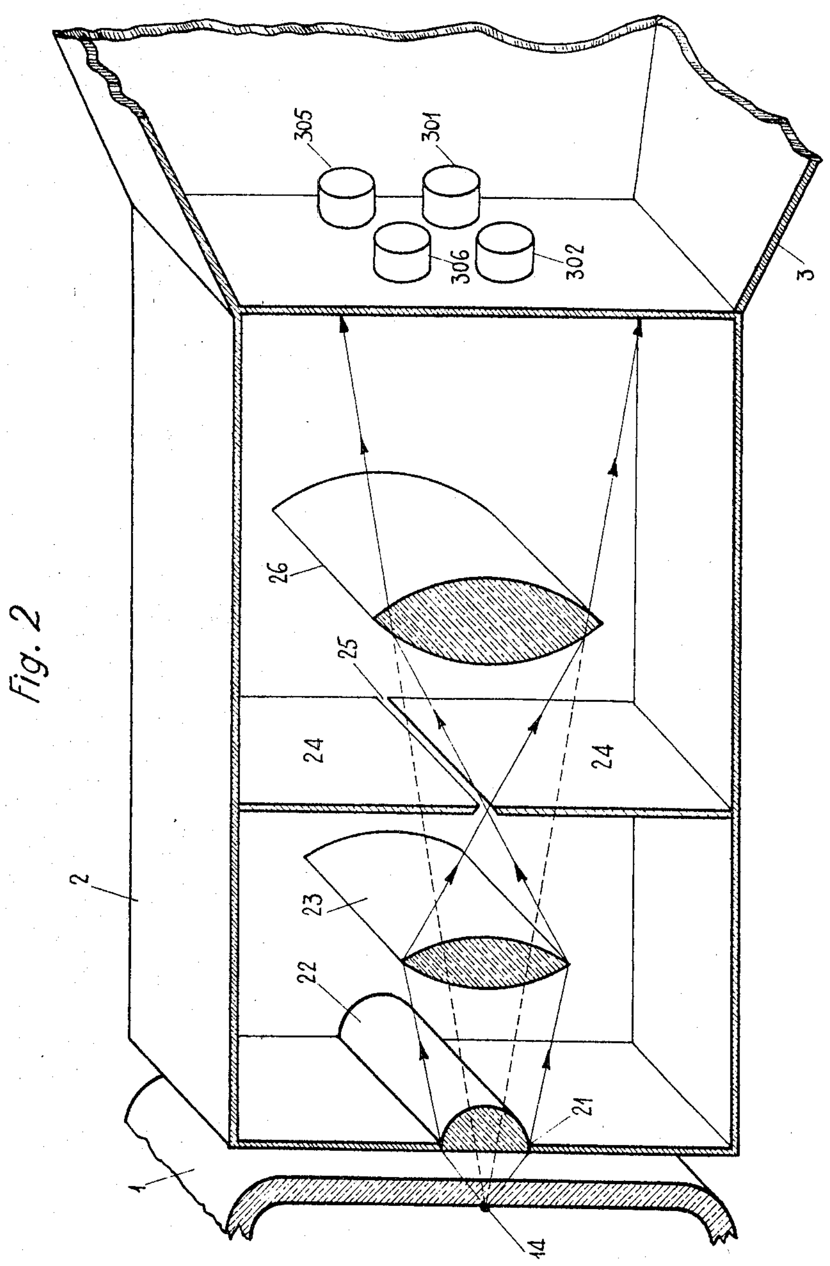

The light emitted by the spot 14 enters the cylindrical collimator 2 by the window 21, in which a cylindrical lens 22 is inserted in the manner shown in FIGURE 2.

Figure 3:
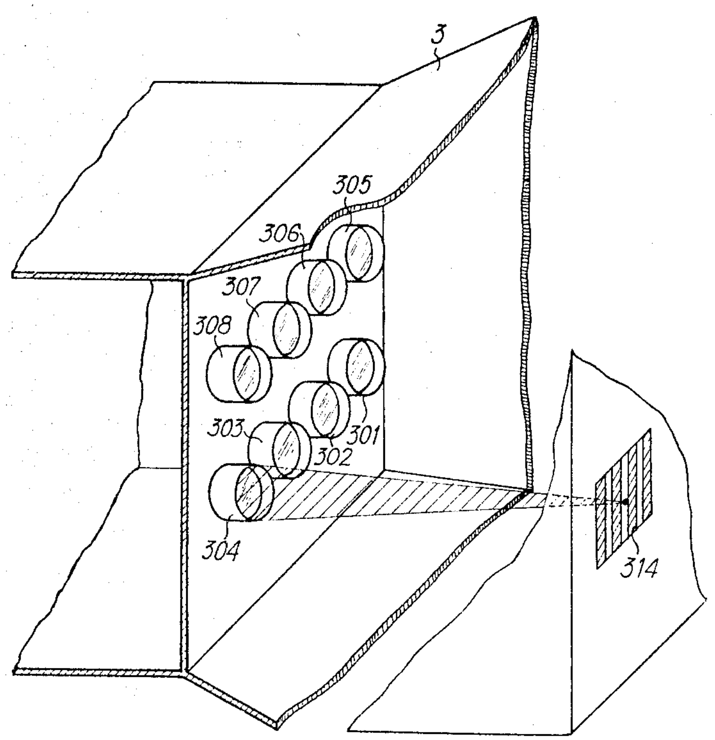

This figure constitutes a section of the collimator 2 taken by a median plane perpendicular to the longitudinal axis of the window 21; in this respect it must be pointed out that, for simplicity of drawing, the latter plane, though a horizontal one as seen in FIGURE 1, appears as a vertical one in FIGURES 2 and 3. The same plane is that of the cross-sections shown in FIGURE 2 of lenses 21, 23 and 26, the generatrices of the outer surfaces of which are parallel to the length of window 21 and to the direction of motion of the spot under the action of the signal voltage from 8 (FIG. 1).

Since all the optical elements contained in the collimator 2 (FIG. 2) are of convex form and have parallel edges, their main optical axes being situated in a common plane, it is convenient to analyze their functioning in two perpendicular planes, one being perpendicular to the edges and surface generatrices of the different cylindrical lenses (it is the plane of the shown cross-sections of the lenses in FIGURE 2, which coincides with the horizontal plane in which the spot is contained at the instant of its passing through the vertical symmetry axis of the screen) and the other being parallel to the direction of these edges and containing the central axes of the lenses; this is the vertical plane of symmetry of the cylindrical collimator 2, which, in FIGURE 2, appears as a horizontal median plane of slit 25 and lenses 22, 23 and 26, parallel to the edges of the latter.

In the horizontal plane which contains the spot, at such instant, the divergent rays issuing from the cylindrical lens 22 are transformed by the lens 23 into a convergent beam. In the plane perpendicular to this horizontal plane and to the main axes of the lenses and passing through the real image of the spot 14 as formed by the lenses 22 and 23, is inserted a masking plate 24 provided with a narrow slit 25 located in the vertical plane of symmetry of the collimator, i.e. the median plane parallel to the length of window 21.

The light beam passing from the spot 14 through the lenses 22 and 23 is generally intercepted by the masking plate 24. However, if the spot 14 is formed in the immediate vicinity of the vertical plane of symmetry of the collimator, the beam encounters the slit 25 and is thus not intercepted.

In this latter case, the convex cylindrical lens 26, whose main axis is likewise in the same vertical plane of symmetry, receives the light beam in question and transforms it into a divergent beam issuing from a virtual point source.

Near the vertical plane of symmetry of the collimator 2, the lenses 22, 23 and 26 act as transparent plates with parallel faces and thus produce a virtual image of the spot 14 situated slightly in front of the spot itself. This virtual image will now be referred to as the "virtual spot."

The focal length and position of the lens 26 are such that the virtual image which it produces of the point of intersection of the vertical slot 25 with the horizontal plane containing the spot 14, coincides with the said "virtual spot." Consequently, aberrations apart, the beam emanating from the collimator 2 is a divergent one issuing from the virtual spot.

In conclusion then, the cylindrical collimator 2, aberrations apart, produces a virtual point image of the spot 14 only in the case where the said spot is situated in the vertical plane of symmetry of said collimator.

Figure 4:
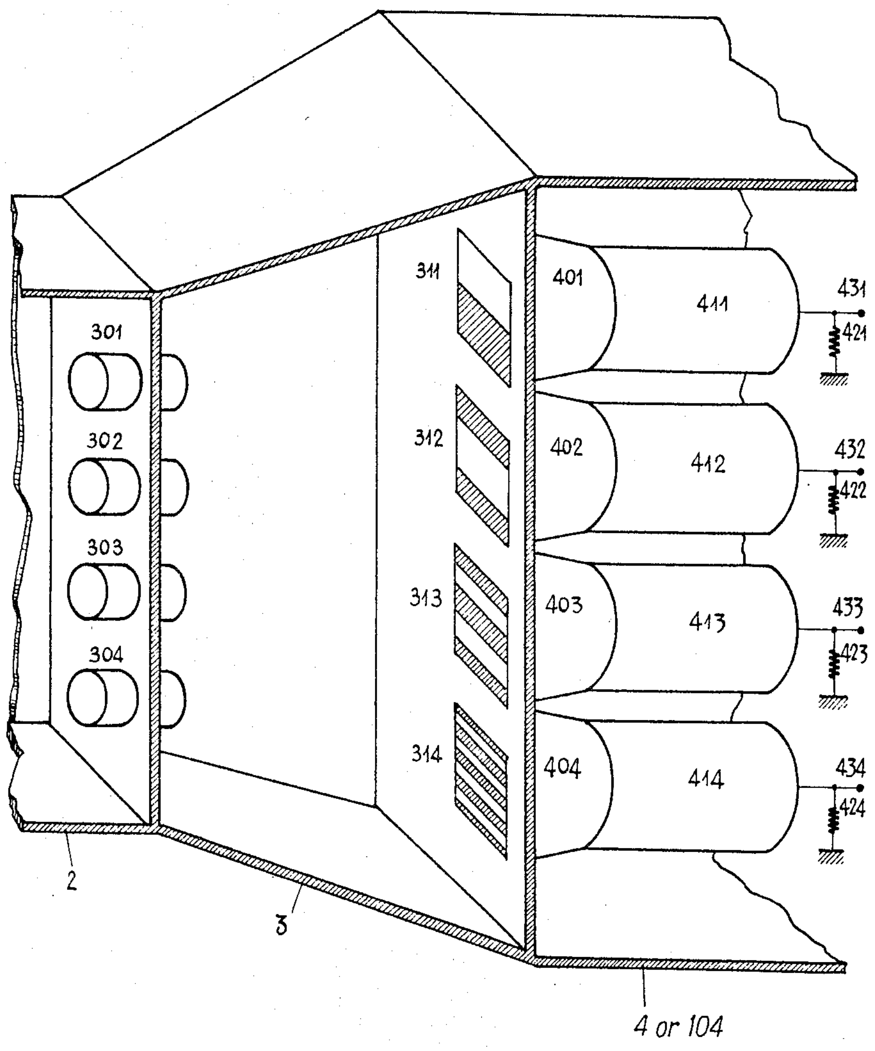
FIGURE 4 illustrates in perspective a device for encoding optical signals used in the invention and a part of an associated optical-electrical transducer, both cut away in one of their central planes of symmetry.

The conical light beam issuing from the cylindrical collimator 2, encounters eight identical objective lenses 301–308 (FIGURES 2 and 3), which produce a real image of the virtual spot on each of the associated coding masks such as 314 (FIG. 3). These lenses and masks make up part of the optical encoding device 3 illustrated in FIGURE 4. In FIGURE 4, only the masks 311–314 are illustrated, but it will be understood that there is a mask associated with each one of the eight lenses.

The eight lenses 301–308 (FIG. 3) which are arranged in a plane parallel to the screen of the cathode-ray tube, are so arranged that the luminous flux which each one receives from the virtual spot is as far as possible constant whatever be the momentous position of the spot along the window 21 (FIG. 2).

The coding masks, four of which 311 to 314 are shown in FIGURE 4 are so disposed that for a given position of the spot 14 in the vertical plane of symmetry of the cylindrical collimator 2, the position of its image on all said masks is at the same distance from a selected reference edge (for instance, the upper edge) of each of such masks, all of which have the same vertical height.

Thus, at each sampling instant, this image appears at a distance from the reference edge of the coding mask proportional to the instantaneous value of the intelligence signal applied to the input of the device.

The masks such as 311–314 all have the same dimensions and are constituted, as already mentioned, by alternate opaque or transparent strips, the spacing and position of which with respect to their reference edge are such that if the digit *one* is allotted to those of them for which the image of the virtual spot is formed on a transparent part, and the digit *zero* to those for which the image of this same spot is formed on an opaque part, one obtains (the screens being arranged in specific order) the binary number which expresses in the reflex binary code the distance from the reference edge of the virtual spot image. This distance is measured by taking as a unit the common height of to all masks divided by $2^8=256$ (or, more generally, by $2^n$ for $n$ screens), such unit being hereinafter designated as the "quantization unit."

It is desirable that the passage of the spot image on a coding mask from one position to an immediately adjacent one should produce the least possible modification in the corresponding signal. As is well known, the reflex binary code is particularly advantageous from this viewpoint, since in this way one obtains the code number representing a spot position merely by changing one of the binary digits of the coded group representing an adjacent position. In that way, if the image of the virtual spot on the coding masks has an appreciable area and produces the false emission of the digit *one* by encroaching on an opaque zone, the error remains less than one quantization unit.

The simultaneous encoding enables the circuits associated with each code element to operate at the slowest possible rate, viz., the sampling rate. Consequently, the circuits employed can have a relatively narrow bandwidth and, in particular, amplification of the coded signals can be effected without much difficulty.

Furthermore, with simultaneous encoding, the code elements are determined independently of each other and the reflex code eliminates any risk of great error.

Referring now again to FIGURE 4, the optical code signals appear after passage through the masks such as 311 to 314.

By means of the optical condensers 401 to 408 provided in the transducer 4 which converts coded optical signals into coded electric pulses, which condensers are illustrated in part in FIGURE 4, the masks are linked to the photo-multiplier tubes 411–414. In FIGURE 4, only four condensers and four photo-multiplier tubes are shown, but it should be understood that there are as many such condensers and tubes as there are digits in the selected code.

The anodes of the photo-multiplier tubes 411–414 feed respectively into load resistances 421–424 such that voltage pulses appear between their output terminals 431–434 and a reference point, conventionally designated as "ground."

As far as the photo-multiplier tubes 411–414 used in the transducer 4 are concerned, it can be pointed out that they are essentially comprised of a photo-electric cell followed, in the same envelope, by a high-gain wide-band current amplifier. This amplifier employs the secondary electron emission principle.

The photo-multiplier tubes are highly sensitive to light so that, with the device which forms the subject of the invention, allowance must be made for the residual light emitted by the cathode-ray tube due to the persistence of the fluorescent screen.

At a given sampling instant, if the correct digit is *zero*, the photo-multiplier tube considered receives the residual light which, since it varies slowly, can be considered as a source of constant illumination. If the digit is *one*, the luminous flux increases sharply and then fal's off in accordance with an approximately exponential law. It will be seen therefore, that the digit *one* is characterized by an extremely rapid growth in the average number of electrons emitted by the photo-multiplier tube, but that it can only appear at recurring instants.

It is therefore necessary to improve as much as possible discrimination between the digit *one* and the digit *zero*, on the basis of the facts illustrated.

Further, discrimination is made more difficult due to the fact that for the usual orders of magnitude of spot brightness, the average number of electrons released from the photo-cathode by the optical signal corresponding to the digit *one* is low, this making for considerable fluctuations in the electrical coded signal.

Figure 5:
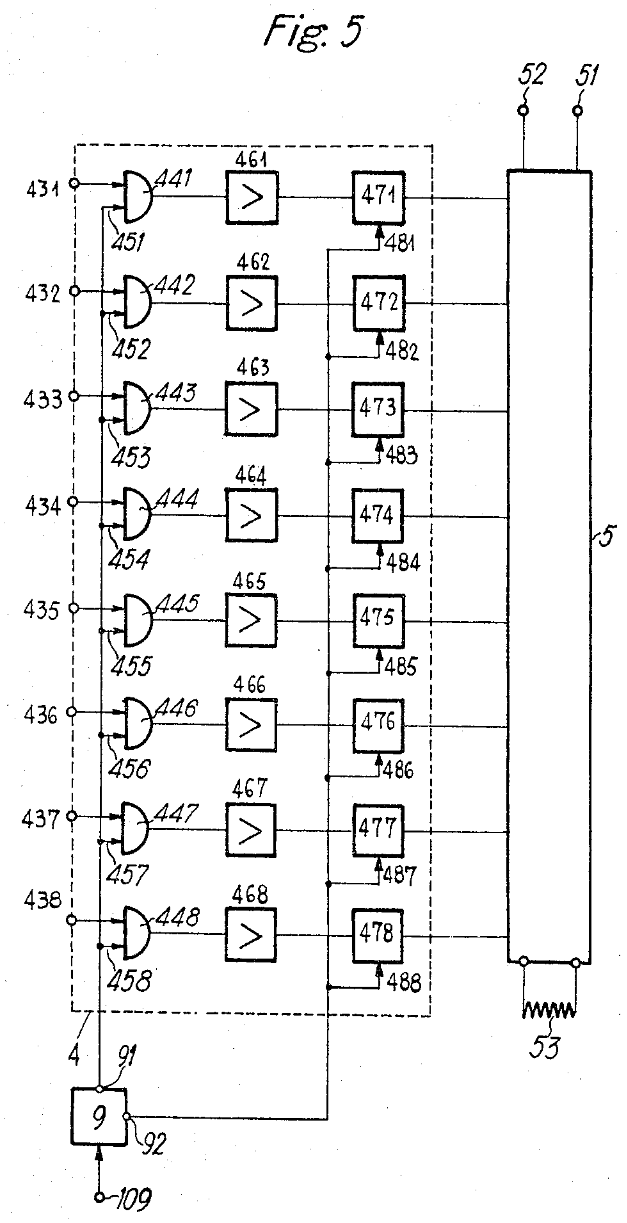
FIGURES 5 and 6 show two variant forms of the arrangements employed in the threshold devices used in the invention.

If these fluctuations are comparatively large, discrimination may be effected with the aid of the circuit illustrated in FIGURE 5.

The pulse voltages issuing from the eight photo-multiplier tubes and appearing between the output terminals 431–438 and the ground are applied to the first inputs of eight gate circuits 441–448 which transmit the signals applied thereto only if their second (or control) input, 451–458, is in the binary state *one*, i.e. submitted to a suitable control voltage. These same gate circuits transmit no signal, i.e remain blocked, if the inputs 451–458 are in the binary state *zero*, i.e receive no control signal.

To this effect, all the inputs 451–458 receive a suitably timed control signal issuing from the output 91 of the shaping network 9, itself supplied by the time base 6 of FIGURE 1, which delivers control pulses at the sampling frequency.

The outputs 441–448 of the gate circuits are respectively connected to the amplifiers 461–468, the characteristics of which will be described hereinafter. The signal issuing from the amplifiers 461–468 are applied to one of the inputs of the amplitude discriminators 471–478. These discriminators are of the type which produces a pulse of suitable shape and length whenever an "interrogation pulse" from the output 92 of the shaping network 9, is applied to their control inputs 481–488; they do this if, and only if, the voltage at their inputs exceeds a certain threshold value.

The pulses produced by the amplitude discriminators 471–478 arrive at the uniformly distributed tappings in the delay line 5, one of whose terminal pairs is closed on a load resistance 53, the other, constituted by the terminals 51 and 52, constituting the output of the sampling and encoding device.

The principle of operation is as follows:

The control pulse issuing from the output 91 of the shaping network 9, renders the gating circuits 441–448 conductive for a time interval $T_1$ selected in the same order as the persistence time of the spot of the cathode-ray tube screen, at an instant corresponding to the possible appearance of response pulses in the photo-multiplier tubes 411–418 when these have been subjected to luminous excitation by the virtal spot images.

The blocking of the gate circuits 441–448 has the effect of eliminating possible parasitic responses which may arise from a variety of sources.

The amplifiers 461–468 are so built as to be capable of delivering an output pulse with an approximately flat summit of duration $T_1$, with a negligible "tail" effect at a time T after the beginning of this pulse, T designating the sampling time interval.

The sampling frequency signals emitted by the shaping network 9 are:

At the output 91, a pulse of length $T_1$, the front edge of which coincides with the possible appearance of pulses resulting from excitation of the photo-multiplier tubes by the virtual spot image;

At the output 92, a short pulse coinciding with the instant at which the voltages appearing across the output terminals of the amplifiers 461–468, the associated photomultiplier tubes responding to luminous excitation, are at a maximum. In this manner, the voltage at the outputs of the amplifiers 461–468, at the instant at which the interrogation pulse appears, is substantially proportional to the number of electrons emitted by the photo-cathodes of the photo-multiplier tubes 411–418 during the time $T_1$ for which the gate circuits 441–448 are open.

If the output voltage from the amplifiers 461–468 is higher than the threshold voltage of the associated binary discriminators 471–478, the latter produce a pulse representing the binary digit *one*. If, on the other hand, the output voltage from the said amplifiers is lower than the threshold of these binary discriminators, no pulse is emitted, this condition representing the binary digit *zero*.

The pulses representing the binary digits, which pulses are emitted by the amplitude discriminators 471–478, are time-staggered by means of the delay line 5.

The just described device operates correctly even in the presence of considerable fluctuations, as long as the time $T_1$ is sufficiently short with respect to the sampling interval T.

Figure 6:
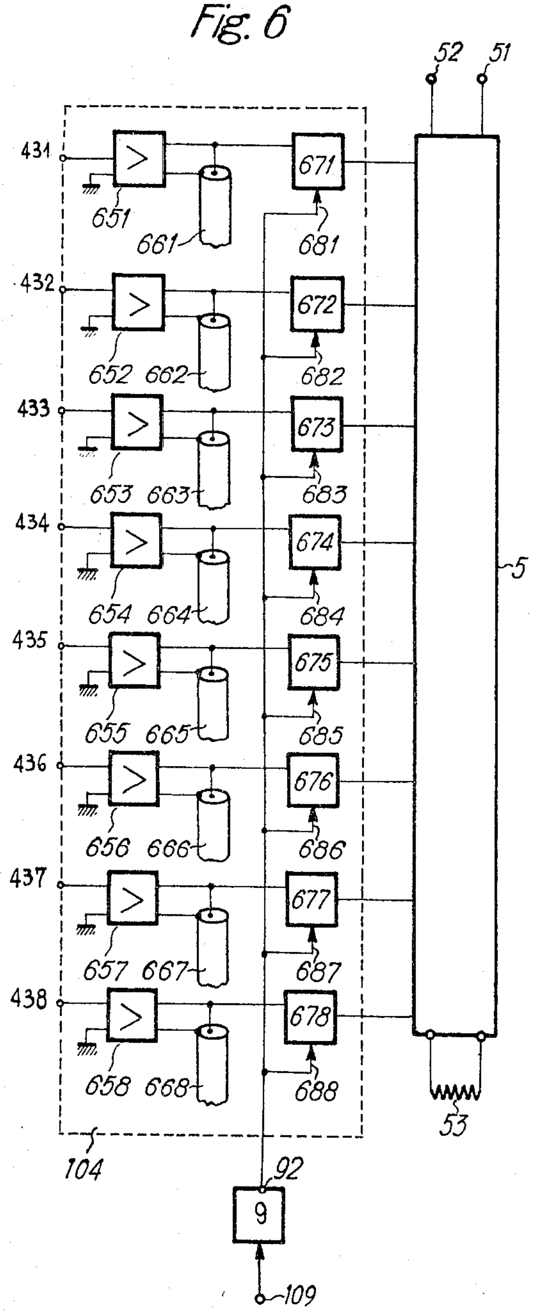

Referring now to FIGURE 6, a description will be given of a variant 104 of the system for utilizing the signals delivered by the photo-multiplier tubes, capable of operating at a higher speed than that of FIGURE 5 but also more sensitive to fluctuations.

The voltages appearing at the terminals 431–438 of the photo-multiplier tubes 411–418 are applied directly to the amplifiers 651–658 which serve as separators and impedance-matching devices.

The output terminals of each of the amplifiers 651–658 are connected in parallel:

On the one hand to one of the ends of each of the lines 661–668, the other ends of which are short-circuited; the electrical length of these lines is such that an electrical pulse has a propagation time through them in the same order as the pulse response time of the amplifiers 651–658. The surge impedance of the lines 661–668 matches the output impedance of the amplifiers 651–658, and On the other hand to the input of one of the amplitude discriminators 671–678 respectively, which are identical with the amplitude discriminators 471–478 of FIGURE 5 and are controlled in the same manner by an interrogation pulse issuing from the terminal 92 of the shaping network 9.

The instant at which the interrogation pulse appears coincides with the maximum voltage at the input of the discriminator (671 for example) when the response of the photo-multiplier tube 411 is *one*.

In this case, the delay lines 661–668 have the effect of differentiating with respect to time the signal applied to them and thus of generating a pulse correspond to the front edge resulting from the sudden response of the photo-multiplier tubes to excitation by the virtual spot. The amplitude of the pulses thus produced is compared with a threshold voltage by the amplitude discriminators 671–678.

The time distribution of the pulses emitted by the amplitude discriminators 671–678, is effected by the delay line 5 in the manner already indicated in connection with the circuit of FIGURE 5.

What is claimed is:

1. A coder for a wide band intelligence signal, comprising a cathode-ray tube having a fluorescent screen, first means for deflecting the electron-beam of said tube in a first given direction proportionally to the amplitude of said signal, second means for deflecting said electron-beam in a second given direction perpendicular to said first direction under the action of a periodic scanning voltage, means for controlling the intensity of said electron-beam by said scanning voltage, a plurality of coding masks each having alternate transparent and opaque parts arranged in rectilinear strips parallel to said second direction, an optical system for projecting the light beam issuing from the luminous spot produced by the impact of said electron-beam upon said screen onto said masks, photoelectric tubes so located with respect to each of said masks as to receive projected light passing through the transparent parts of each one of said masks, and an electric utilization circuit receiving electric pulses generated by said light in said photoelectric tubes; said optical system comprising first optical means including at least one cylindrical lens for focussing said light beam upon a narrow transparent slit parallel to said first direction, second optical means including at least one further cylindrical lens and receiving light passing through said slit and producing a virtual image of said spot substantially located in the surface of said screen, a plurality of objectives receiving light from said virtual image and respectively projecting it on each one of said coding masks, and a plurality of optical condensers respectively focussing light passing through each one of said masks onto a corresponding one of said photoelectric tubes.

2. A coder as claimed in claim 1, wherein said photoelectric tubes are photomultiplier tubes.

3. A coder as claimed in claim 1, wherein said means for controlling the intensity of said electron-beam by said scanning voltage include a phase-shifting network.

4. A coder as claimed in claim 1, wherein each one of said masks has its transparent and opaque parts so arranged as to represent at each point thereof one binary digit of a number proportional to the distance of said point to one selected edge of said mask parallel to said second direction, said number being translated into the reflex binary code, each one of said transparent and opaque parts respectively corresponding to either of a *one* and a *zero* digit in said code, and each one of said masks corresponding to a different binary order in said code.

5. A coder as claimed in claim 1, wherein the pulses delivered by said photoelectric tubes are staggered in time by at least one delay network.

6. A coder as claimed in claim 1, wherein said utilization circuit includes a threshold device suppressing all pulses having an amplitude lesser than a predetermined amplitude.

7. A coder as claimed in claim 6, wherein said threshold device includes gated amplifiers controlled by pulse voltages derived from a periodic voltage source synchronous with said periodic scanning voltage.

8. A coder as claimed in claim 6, wherein the pulses delivered by said photoelectric tubes are differentiated with respect to time before being applied to said threshold device.

References Cited by the Examiner

UNITED STATES PATENTS

| | | | |
|---|---|---|---|
| 2,489,883 | 11/1949 | Hecht | 325—43 |
| 2,721,900 | 10/1955 | Oliver | 178—5 |
| 3,075,147 | 1/1963 | Llewllyn | 325—43 |
| 3,155,961 | 11/1964 | Shumway | 315—8.5 X |

DAVID G. REDINBAUGH, *Primary Examiner.*

R. L. GRIFFIN, *Assistant Examiner.*